(12) United States Patent
Thomas

(10) Patent No.: US 6,422,280 B1
(45) Date of Patent: Jul. 23, 2002

(54) HEAVY DUTY TIRE WITH SPECIFIED BEAD DESIGN

(75) Inventor: Anthony William Thomas, Hyogo (JP)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/331,864

(22) PCT Filed: Jan. 30, 1997

(86) PCT No.: PCT/US97/01767

§ 371 (c)(1), (2), (4) Date: Jun. 24, 1999

(87) PCT Pub. No.: WO98/33670

PCT Pub. Date: Aug. 6, 1998

(51) Int. Cl.[7] ............................ B60C 15/04; B60C 15/05
(52) U.S. Cl. .......................... 152/540; 152/545; 245/1.5
(58) Field of Search ........................ 152/540, 541, 152/539, 545; 245/1.5

(56) References Cited

U.S. PATENT DOCUMENTS

| | | |
|---|---|---|
| 1,184,691 A | 5/1916 | Raymond |
| 1,310,212 A | 7/1919 | Raymond et al. |
| 1,357,098 A | 10/1920 | Kryder |
| 1,485,864 A | 3/1924 | Maranville |
| 1,513,434 A | 10/1924 | Sloper |
| 1,595,313 A | 8/1926 | Pierce |
| 1,665,070 A | 4/1928 | Pierce |
| 1,749,899 A | 3/1930 | Alderfer |
| 1,943,272 A | 1/1934 | Lerch |
| 1,943,273 A | 1/1934 | Lerch |
| 1,943,274 A | 1/1934 | Lerch |
| 2,053,519 A | 9/1936 | Crowley |
| 2,119,557 A | 6/1938 | Randel |
| 3,612,139 A | 10/1971 | Marzocchi et al. |
| 3,910,336 A | 10/1975 | Boileau |
| 3,938,575 A | 2/1976 | Boileau |
| 4,790,364 A | 12/1988 | Lobb et al. |
| 4,813,467 A | 3/1989 | Hinkel et al. |
| 5,058,649 A | 10/1991 | Hoang et al. |
| 5,198,050 A | 3/1993 | Gifford |
| 5,368,082 A | 11/1994 | Oare et al. |
| 5,429,168 A | 7/1995 | Lobb et al. |
| 5,524,688 A | 6/1996 | Trares et al. |

FOREIGN PATENT DOCUMENTS

| | | | |
|---|---|---|---|
| DE | 43 10 714 A | 10/1994 | |
| EP | 0 253 208 A | 1/1988 | |
| FR | 2 374 173 A | 7/1978 | |
| GB | 2 149 728 A | 6/1985 | |
| JP | 7-125509 A | * 5/1995 | ................. 152/545 |

* cited by examiner

*Primary Examiner*—Adrienne C. Johnstone
(74) *Attorney, Agent, or Firm*—David L King

(57) ABSTRACT

An improved heavy duty pneumatic tire designed to be mounted on an associated design rim having a flange portion is described. The rim flange has an axially inward surface contacting the axially outward portion of the bead area of the tire and an axially outward radially extending outer surface. Each bead portion has a surface contacting a radially inner portion of the rim flange and one or more bead cores that extends radially above the radially outer surface of the rim flange.

9 Claims, 11 Drawing Sheets

HEAVY DUTY TIRE WITH SPECIFIED BEAD DESIGN

TECHNICAL FIELD

This invention relates to heavy duty pneumatic tires such as are commonly used on earthmoving equipment, aircraft, agriculture and specialty applications such as run-flat tires, and more particularly to pneumatic tires having a specified relationship between the lower bead area of the tire and a flange portion of an associated rim upon which the tire is designed to be mounted.

BACKGROUND ART

Pneumatic tires that experience high loads and deflections such as off-the-road earthmover and airplane pneumatic tires have historically been subjected to tremendous stresses and heat buildup problems in the bead area. Agricultural drive axle tires and specialty tires similarly experience extremely high levels of torque which requires the bead and rim fitmer to be precisely matched to avoid tire-to-rim slippage. These tires operate at very high internal pressures and are filled with large volumes of internal fluids, generally air or some other inert gas. Radial deflections of these tires generally occur under very high impacts while the tire is heavily loaded. In the past, these tires would deflect with the bead portion contacting the rim flange harshly. Repeated impacts in this area can cause a phenomena commonly referred as "bead erosion". These severe deflections stress the internal components of the tire carcass such as ply endings and other component interfaces, and if severe enough can initiate ply ending separation or other associated problems which can injure the tire's casing.

A recent development in pneumatic tires is the run-flat passenger tire. These run-flat tires, unlike the abovementioned high pressure and high-torque tires of the aircraft and off-the-road industry, normally operate similarly to conventional passenger tires with one big exception, these tires generally have stiffened sidewalls that when the tire is operated with little or no air must support the weight of the vehicle. In such situations, high deflection and loads are transmitted to the bead area of the tire. Rapidly, these uninflated tires build up high heats which can limit the run-flat capability of the tire. In these circumstances, the run-flat passenger tire becomes overstressed and overloaded similar to the conditions seen in the high pressure, high load and high torque applications of the larger aircraft and off-the-road tires. Therefore, the run-flat tire design also must be equipped to accommodate these conditions.

In U.S. patent 5,368,082 a unique bead design was disclosed for run-flat tire applications. The bead was made of a single steel monofilament having a truncated triangular shape. This bead design had a very wide based that ensured that the tire remained seated on the rim when the tire was operated in an uninflated condition. The tire had a hard rubber apex flange. The bead core was radially extended a distance substantially below the radially outer surface of the rim flange.

Large pneumatic tires to be used on earthmoving equipment, commonly known as earthmover tires, are well known. Earthmover tires are required to perform in difficult environments. When used "off-the-road", they are required to provide excellent traction for extremely heavy vehicles pushing, pulling and lifting extremely heavy loads. The environment is fraught with rocks and other sharp debris which can damage the tires. Due to the relatively high cost of these large tires, durability and long life is a primary design parameter. A second environment in which the tires might be expected to perform is on public highways. Sometime the earthmoving equipment must travel on such highways to move from construction site to construction site.

Previously, the required strength was built into such tires by incorporating certain curves into the molded shape of the exterior of the tire. These extra curves or bulges were believed to give extra support to those areas of the tire where durability was especially important, such as the lower sidewall, mid sidewall and tread center. In the bead flange area, the prior art off-the-road tires employed an interference fit whereby the tire bead portion was in contact with the radially outer surface of the rim flange. Off-the-road tire engineering conventionally added mass to structurally improve the durability of the tire.

In the aircraft tire art, tire engineers must look to reduce mass due to the unique weight limitations. Still the tires still must be durable.

In U.S. Pat. Nos. 4,790,364 and 4,813,467 an aircraft tire and rim combination is disclosed which shows a clearance between a rim flange and the surface of the bead portion of the tire. Although aircraft tires are much different in construction and design compared to earthmover tires or off-the-road tires, they still must survive these high deflections and overload conditions previously discussed.

In U.S. Pat. No. 5,429,168 a unique earthmover design was developed that had permitted a reduction in the thickness of the lower sidewall region and bead portions of the tire by providing a clearance between the rim flange and the bead portion. That invention was particularly adapted for a radial ply carcass construction. It achieved in an earthmover tire some of the beneficial attributes of the aircraft tire technology.

In the present invention a unique bead core design has been found to be very beneficial in both bias or radial ply heavy duty tire applications. As used herein heavy duty tire applications include off-the-road, earthmover, aircraft, agricultural tires and specialty industrial type tires as well as the new run-flat tire technology. The unique design of this bead core enables large reductions in rubber mass to be achieved while increasing the lateral stiffness of the bead portion of the tire.

The present invention also has as one of its objects improved durability in the heavy duty tires, but does so by providing a bead area design which has demonstrated a marked improvement over the prior art.

It is therefore, an object of the invention to provide a heavy duty tire having improved durability.

It is another object of the invention to provide a heavy duty tire having a bead portion which cooperates with the flange portion of an associated rim to improve the durability and rigidity of the bead portion of the tire.

It is a further object of the invention to provide a heavy duty tire bead core having a certain relationship between the flange area of the tire in the rim flange, such relationship creating a clearance between the tire and the radially outer surface of the rim flange. The nature of the clearance is discussed herein and meets certain requirements in order to provide the durability sought.

DISCLOSURE OF THE INVENTION

Summary

An improved heavy duty pneumatic tire 11 is disclosed. The improved heavy duty pneumatic tire 11 has a nominal rim diameter D, an axis of rotation and a carcass 14 having a pair of bead portions 25. Each bead portion 25 has at least one annular inextensible bead core 15. The carcass 14 for a radial ply tire further includes a cord reinforced radial ply 18 extending between and wrapped around the bead core 15. The carcass 14 for a bias ply tire 110 includes pluralities of cord reinforced pairs of bias plies 180. The bias plies 180 have turnup ends 280 that wrap about one or more bead cores 15,150,151,250,251,252. The tire 11,110 has ply turnup ends 28,280 extending axially and radially outwardly from each bead core 15,150,151,250,251,252 and the plurality of reinforcing belt disposed radially outwardly of the ply or plies. A tread 12 is disposed radially outwardly of the carcass 14. Each bead portion has a radially inner first surface 96 and a radially outwardly extending second surface 100. The first and second surfaces 96, 100 of the bead portion 25 are designed to engage a design rim as specified by the applicable standards organization. The design rim 60 has a pair of bead seat portions 92 and a pair of rim flange portions 98 respectively. Each bead portion has the first surface 96 contacting the bead seat portion 92 of the rim 60 and the radially outwardly extending second surface 100 contacting a radially inner portion of the rim flange portion 98. When the tire 11 is mounted onto the rim 60, uninflated and unloaded, the second surface 100 and the rim flange 98 initially cease contact diverge from each other at a location 101 in the cross section of the tire and rim in the region of the flange. One or more bead cores 15,150,151,250,251,252 in each bead portion 25 extend radially outwardly beyond the radial height (H) of the rim flange radially outer surface 100.

The bead cores 15 extend above the rim flange 98 preferably having a radially outer portion 15A that is triangularly shaped and a radially inner portion 15B that rectangular, square, round or trapezoidal in shape. Most preferably the bead core 15 is made of a single monofilament steel or high tensile steel wire wrapped successively to achieve the desired shape.

Definitions. "Aspect ratio" of the tire means the ratio of its section height (SH) to its section width (SW);

"Axial" and "axially" means lines or directions that are parallel to the axis of rotation of the tire;

"Bead" means that part of the tire comprising an annular tensile member wrapped by ply cords and shaped, with or without other reinforcement elements such as flippers, chippers, apexes, toe guards and chafers, to fit the design rim;

"Belt reinforcing structure" means at least two layers of plies of parallel cords, woven or unwoven, underlying the tread, unanchored to the bead, and having both left and right cord angles in the range from 17 degrees to 27 degrees with respect to the equatorial plane of the tire;

"Bias Ply Tire" means that the reinforcing cords in the carcass ply extend diagonally across the tire from bead-to-bead at about a 25–50° angle with respect to the equatorial plane of the tire, the ply cords running at opposite angles in alternate layers;

"Carcass" means the tire structure apart from the belt structure, tread, under tread, and sidewall rubber over the plies, but including the beads;

"Circumferential" means lines or directions extending along the perimeter of the surface of the annular tread perpendicular to the axial direction;

"Chafers" refers to narrow strips of material placed around the outside of the bead to protect cord plies from the rim, distribute flexing above the rim, and to seal the tire;

"Chippers" means a reinforcement structure located in the bead portion of the tire;

"Cord" means one of the reinforcement strands of which the plies in the tire are comprised;

"Design rim" means a rim having a specified configuration and width. For the purposes of this specification, the design rim and design rim width are as specified by the industry standards in effect in the location in which the tire is made. For example, in the United States, the design rims are as specified by the Tire and Rim Association. In Europe, the rims are as specified in the European Tyre and Rim Technical Organization—Standards Manual and the term design rim means the same as the standard measurement rims. In Japan, the standard organization is The Japan Automobile Tire Manufacturer's Association.

"Equatorial plane (EP)" means the plane perpendicular to the tire's axis of rotation and passing through the center of its tread;

"Innerliner" means the layer or layers of elastomer or other material that form the inside surface of a tubeless tire and that contain the inflating fluid within the tire;

"Normal rim diameter" means the average diameter of the rim flange at the location where the bead portion of the tire seats;

"Normal inflation pressure" refers to the specific design inflation pressure and load assigned by the appropriate standards organization for the service condition for the tire;

"Normal load" refers to the specific design inflation pressure and load assigned by the appropriate standards organization for the service condition for the tire;

"Ply" means a continuous layer of rubber-coated parallel cords;

"Radial" and "radially" means directions radially toward or away from the axis of rotation of the tire;

"Radial-ply tire" means belted or circumferentially-restricted pneumatic tire in which the ply cords which extend from the bead to bead are laid at cord angles between 65 degrees and 90 degrees with respect to the equatorial plane of the tire;

"Section height" (SH) means the radial distance from the nominal rim diameter to the outer diameter of the tire at its equatorial plane; and, "Section width" (SW) means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

BRIEF DESCRIPTION OF DRAWINGS

The invention may take physical form and certain parts and arrangements of parts, several preferred embodiments of which will be described in detail in this specification and illustrated in the accompanying drawings which form a part whereof and wherein.

DETAILED DESCRIPTION OF THE INVENTION

Figure 1:
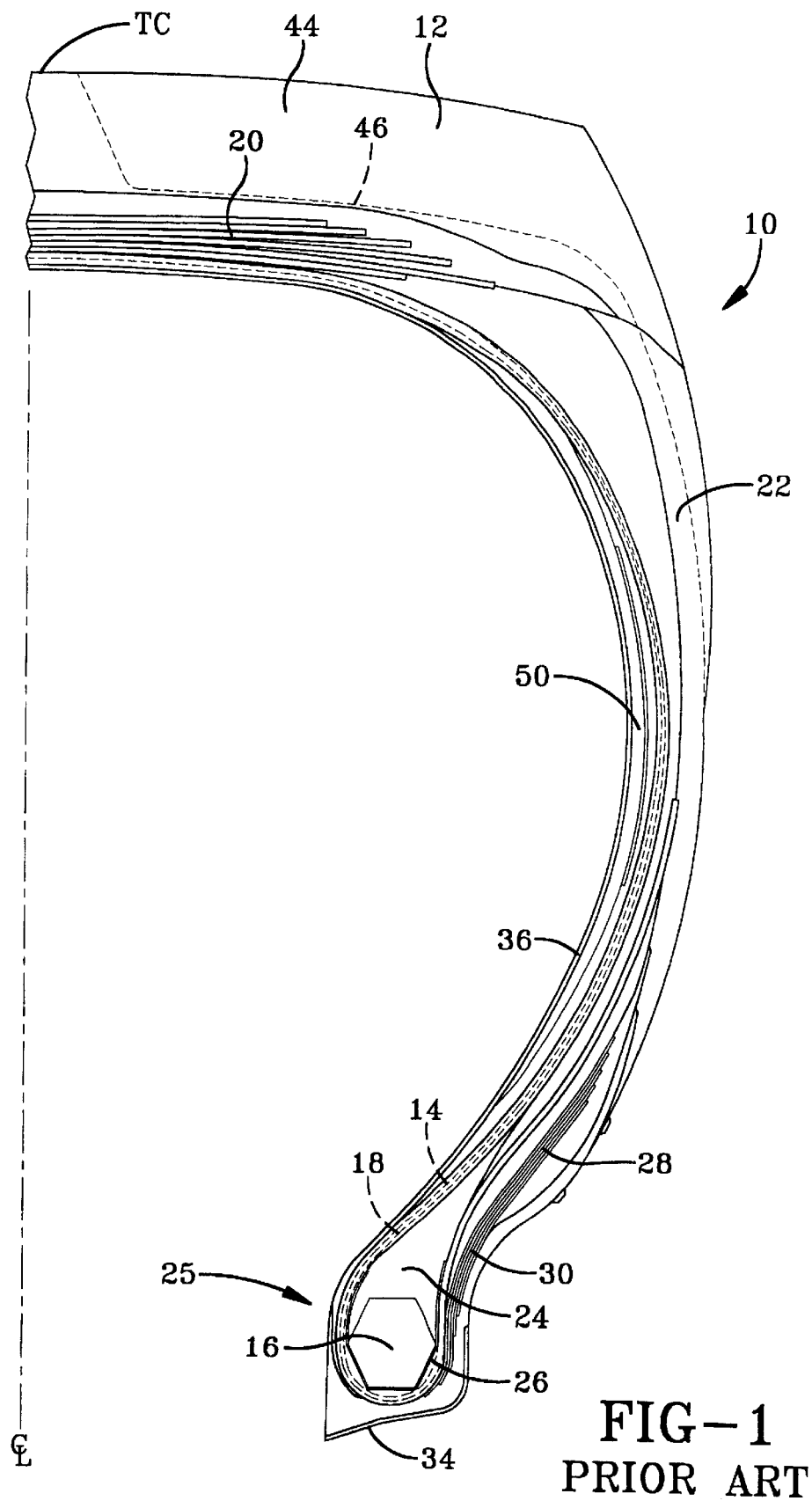
FIG. 1 is a cross-sectional view illustrating one side or one half of a symmetrical earthmover tire according to the prior art.
Figure 2:
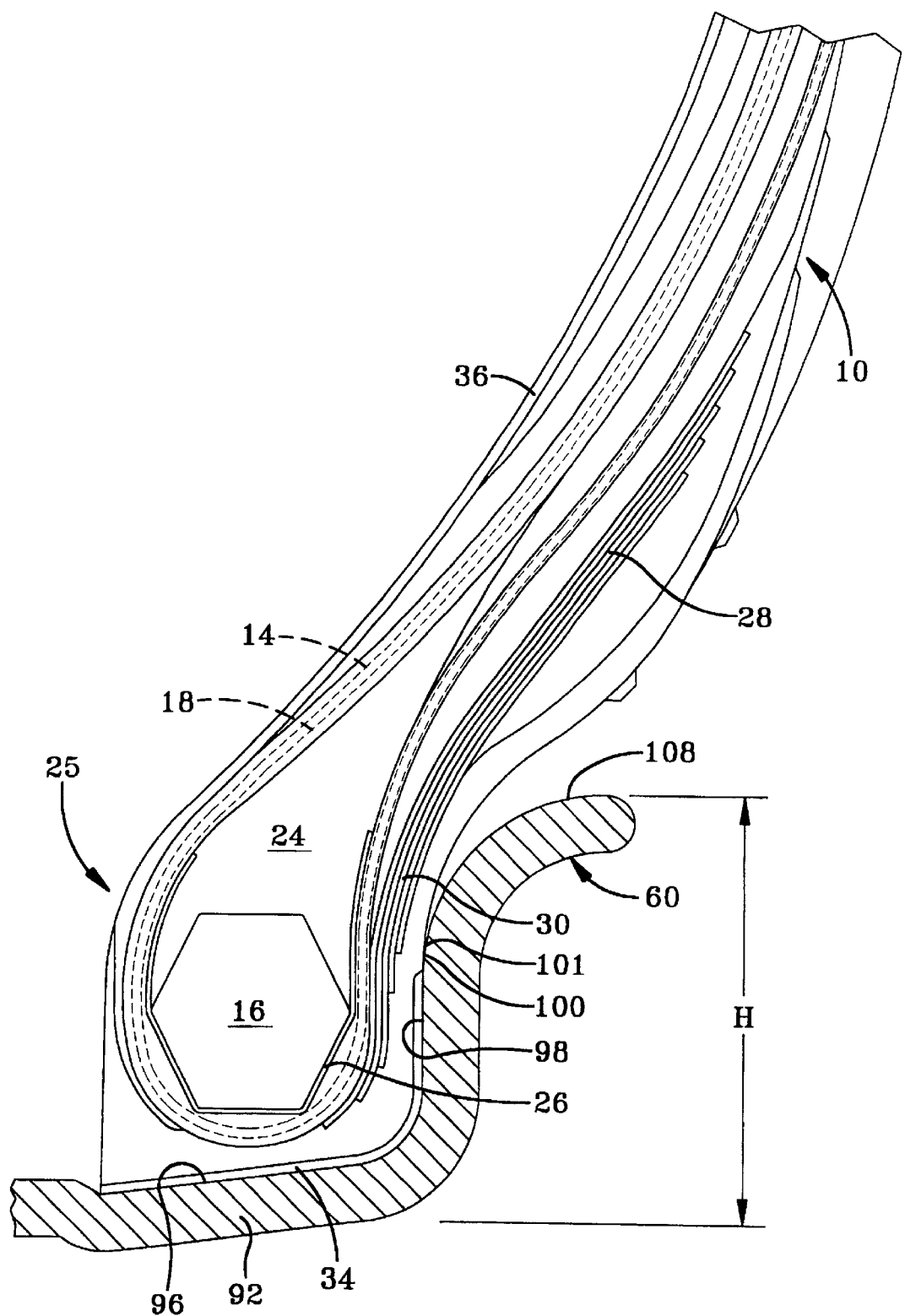
FIG. 2 is an enlarged cross-sectional view illustrating the bead portion of the prior all tire of FIG. 1.

With reference to FIGS. 1 and 2, a cross-sectional view of one half of a prior art earthmover tire 10 is illustrated.

The tire 10 has a tread 12 disposed over the crown region of the carcass 14. The carcass 14 has a pair of inextensible annular beads 16. The illustrated beads 16 are of a hexagonal cross-sectional shape, wrapped about the bead 16 is a steel cord reinforced ply 18. Disposed radially outwardly of the ply 18 is a steel reinforced belt package 20 consisting of at least 4 belts. A pair of sidewalls 22 extend between the tread 12 and the bead area. Above the bead 16 is an elastomeric apex 24. Wrapped around the bead 16 is a flipper 26. The flipper 26 is adjacent the bead 16 and the carcass ply 18. Outward of the ply turn-up 28 are cord reinforced chippers 30. A cord reinforced fabric chaffer 34 is shown in the bead portion. The radially inner portion of the carcass 14 includes an air imperiable inner liner 36. Adjacent the inner liner 36 is an elastomeric ply line insert 50.

The tire tread has a flat tread arc at the center line (CL) of the tread 12 in the area marked TC. The tread 12 includes a plurality of radially outer ground contacting lugs 44 and an inner tread 46.

Figure 3:
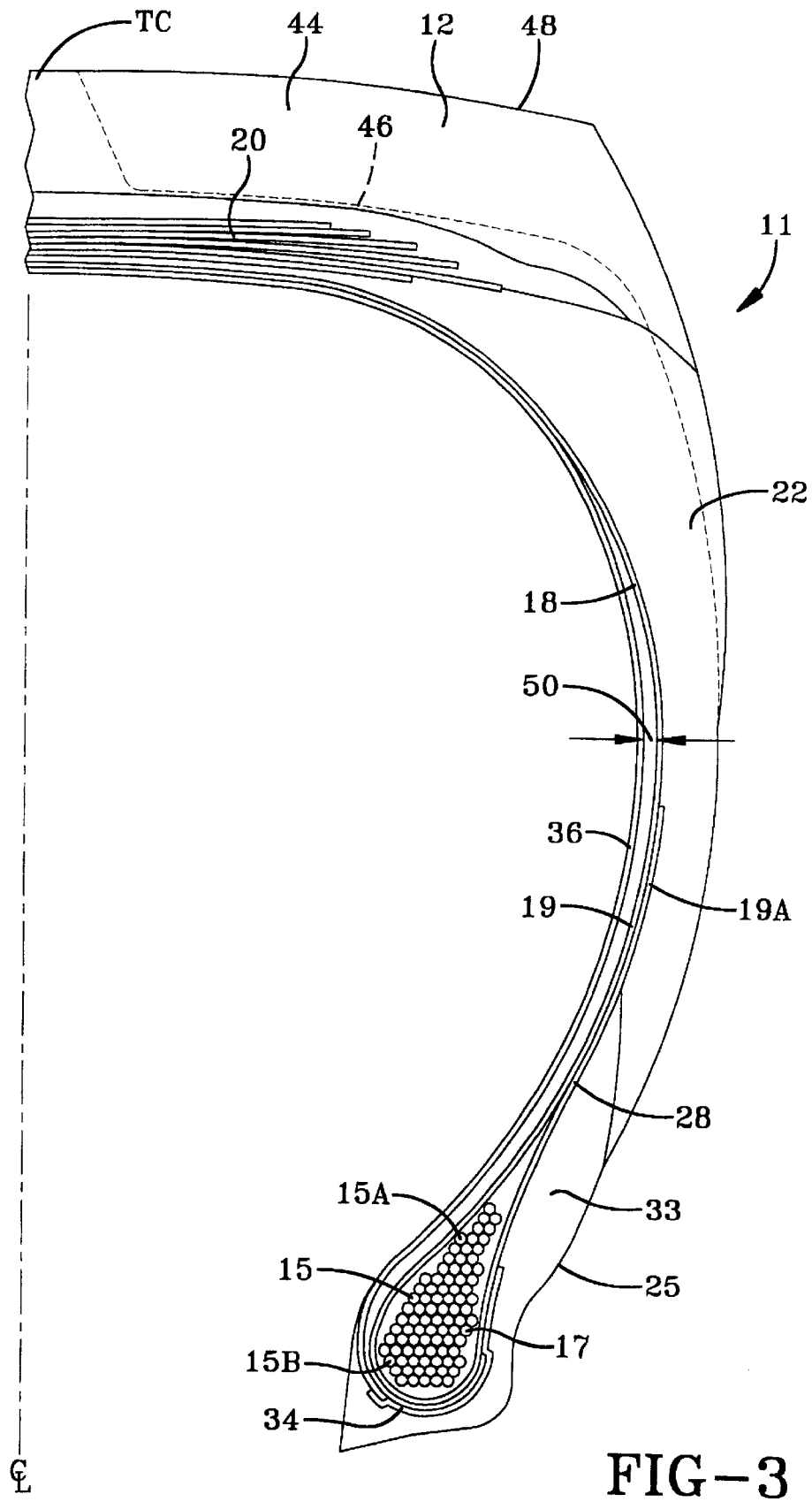
FIG. 3 is a cross-sectional view illustrating one side or one-half of a symmetrical heavy duty tire according to the invention.
Figure 4:
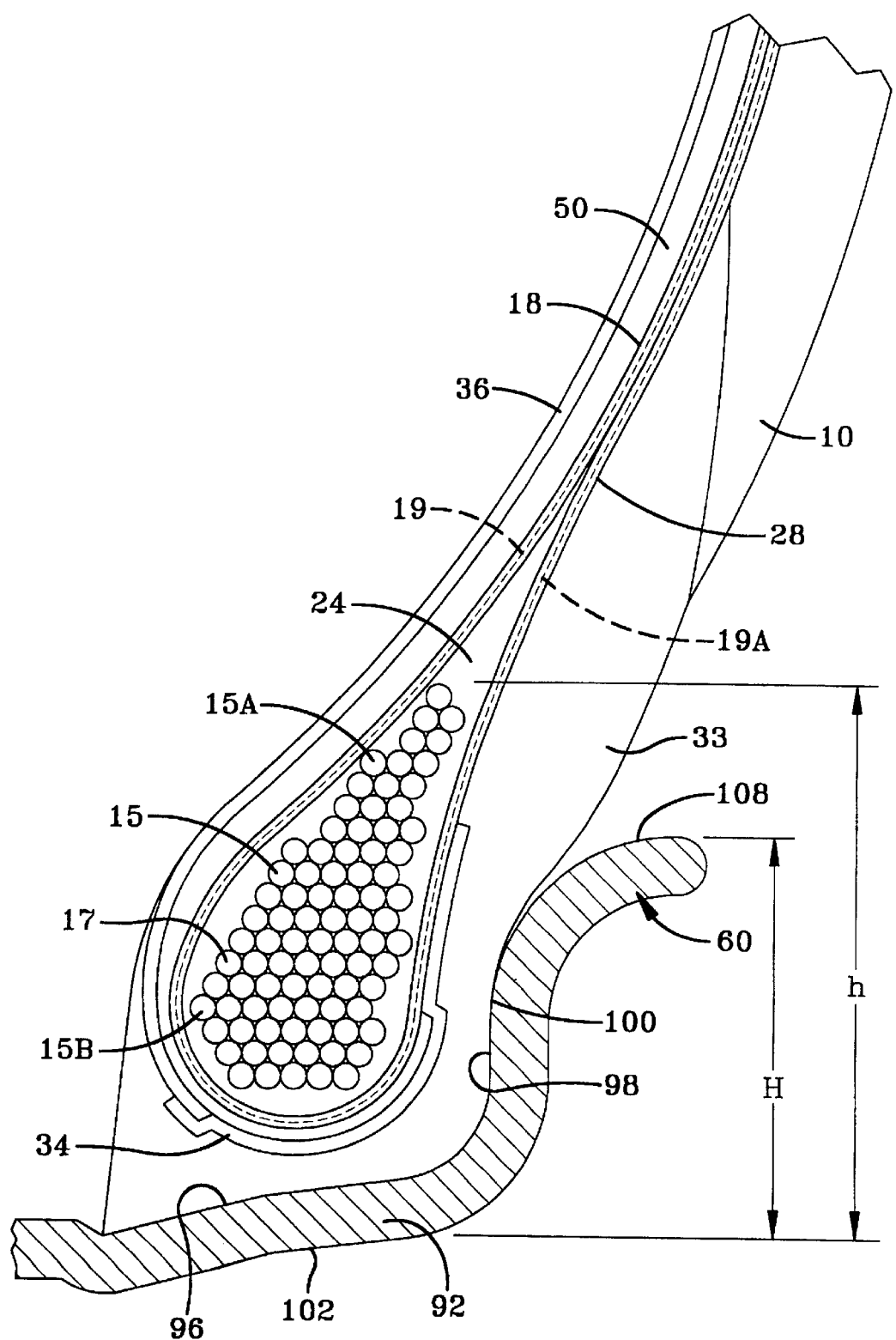
FIG. 4 is an enlarged cross-sectional view of the bead portion of the tire shown in FIG. 3.

With reference to FIGS. 3 and 4 and embodiment of the invention is disclosed for a tire 11 having one bead core 15 in each of its bead portions 25. For purposes of this invention, this tire will be defined as a heavy duty tire which as previously discussed could include earthmover, agricultural tires, specialty tires, aircraft tires and run-flat tires. As shown, the tire has a single ply structure 18 wrapped about the bead core 15. For purposes of this invention, more than one ply reinforcing structure 18 could be employed in either the radial or bias tire applications. In such a case where only one bead core 15 is needed the ply structures 18 would be wrapped about the bead 15 as shown. For purposes of this invention, the component reference numerals of the prior art tire disclosed in FIGS. 1 and 2 if used in the inventive tire and rim are the same with the exception of the bead core 15 itself. In the embodiment shown in FIGS. 3 and 4 the radially outer half 15A of the bead 15 has a triangular configuration while the radially inner half 15B of the bead 15 is approximately trapezoidal.

The bead core 15 is preferably made from a single strand of wire 17 which is wrapped in layers of wires that permit the wires to nest in each progressive layer as shown in FIGS. 3 and 4. This cradling of each interior wire 17 in between radially adjacent layers of wires creates very strong and laterally stiff ring of steel. By using a single strand of wire 17 that is continuously wrapped, the geometric shape of the bead core 15 can be formed easily by simply varying the number of strands within any given layer. This is a particularly useful feature of this bead core 15. It enables the tire designer to favorably direct the ply path 19 and the ply turnup paths 19A to achieve a stress relieving benefit.

A secondary beneficial feature is that the bead portion 25 can be made somewhat narrower and this permits large amounts of rubber to be eliminated from this normally very thick region of the tire 11. In the case of bias tires which often used a plurality of rectangular bead cores 16 in each portion 25 due to the large number of plies used to make the tire, it is recommended that one less bead core can be used when employing this design concept. These concepts will be discussed later in conjunction with the various illustrated embodiments of the invention.

The inventive concept is similar to a lock tie-in bead construction used in light truck tires as shown in U.S. Pat. No. 5,524,688. One key and fundamental difference is that these tires 11 defined herein as heavy duty tires experience larger heavier loads with large percentage deflections of the sidewall that create tremendous heat build up which greatly increases the chances of the turnup 28 separating under these large deflections. All of the tires 11,110 defined herein as heavy duty, with the exception of the run-flat type tires, operate at much higher internal pressures than conventional passenger or light truck tires. The run-flat tire experiences its high load in deflections under 0 pressure conditions and thus warrants classifying its 0 inflation condition as a heavy duty loaded tire.

The present invention employs at least one single strand bead core 15 that extends radially above the radially outer surface 108 of the rim flange 98. As shown in FIG. 3, the bead core 15 can be somewhat inclined at the radially outer apex 15A to be substantially parallel to the ply path 19. The bead core 15 being formed of a single strand of wire 17 means that as the tire 11 attempts to deflect the bead core 15 tends to increase its tension and therefore acts like a very stiff spring which greatly limits the amount of deflection that can occur along the tire bead portion 25 and the rim flange 98.

What this means is that the vast amount of tire deflections under load that would normally cause the prior art tires 10 of FIG. 1 and 2 to hit the rim flange 98 are simply avoided. Furthermore, as the tire 11 reacts under severe load and deflection the spring rate of this inventive tire structure is initially much higher and is approaching the spring rate of the rim flange 98 just prior to contact as opposed to the rubber apex 24 of bead portions 25 of the prior art tires 10 which have spring rates much lower, as compared to the rigid rim flange, particularly, when the tire is running hot. Upon a contact of the prior art bead 25 onto the rim flange 98 a transient shock load occurs which, when the tire 10 is severely overloaded, could repeatedly and excessively stress the adhesion of the ply turnup ends 28. The tire 11 of the present invention in the region of the bead portions 25 is superior in surviving these severely overloaded conditions. The tire 11, as shown in FIGS. 3 and 4, is formed without requiring a rubber apex 24 to be placed above the bead core 15. In some applications, the tire designer may choose to apply a gum strip or small apex 24 to the radially outer portion 15A of this bead core 15. Additionally, in most applications it is felt that the use of such prior art components as fabric chafers 34 or chippers 30 may be totally eliminated as well as the elastomeric apex 24.

It is believed desirable that a gum chafer 33 should be added to the axially outer bead portion as illustrated.

Figure 7:
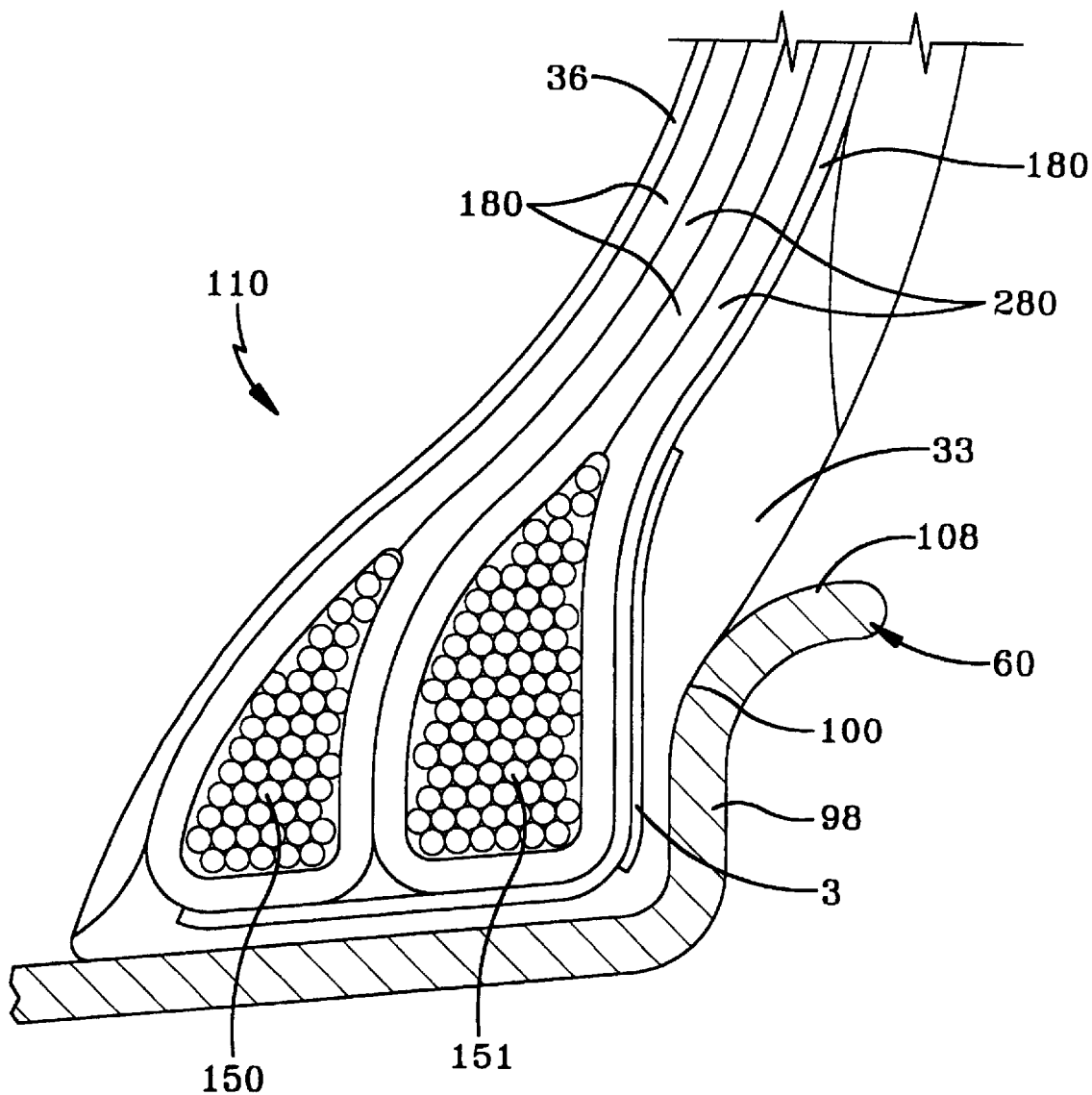
FIG. 7 is a cross-sectional view of the bead portion of a tire employing dual beads according to the invention.

With reference to FIGS. 7 and 8, the use of this novel bead core 15 design is even more beneficial in heavy duty bias tire off-the-road applications. Conventionally, bias tires may employ two, three or even four bead cores in each bead portion 25. Typically these bead cores were formed using a strap bead wire bundle wherein several separate wires are used, making layers of wires bundled or strapped together as is known in the prior art. This use of multiple bead cores 16 was required due to the large number of plies 18 that must be wrapped around the bead cores 16. If too many plies 18 are wrapped about a bead core, the necessary staggering of the turnup ends 28 can result in an excessive waste of material or if too close an overlapping of the terminal location of the ply ends 28 occurs an increase in turnup end separations may result.

Figure 10:
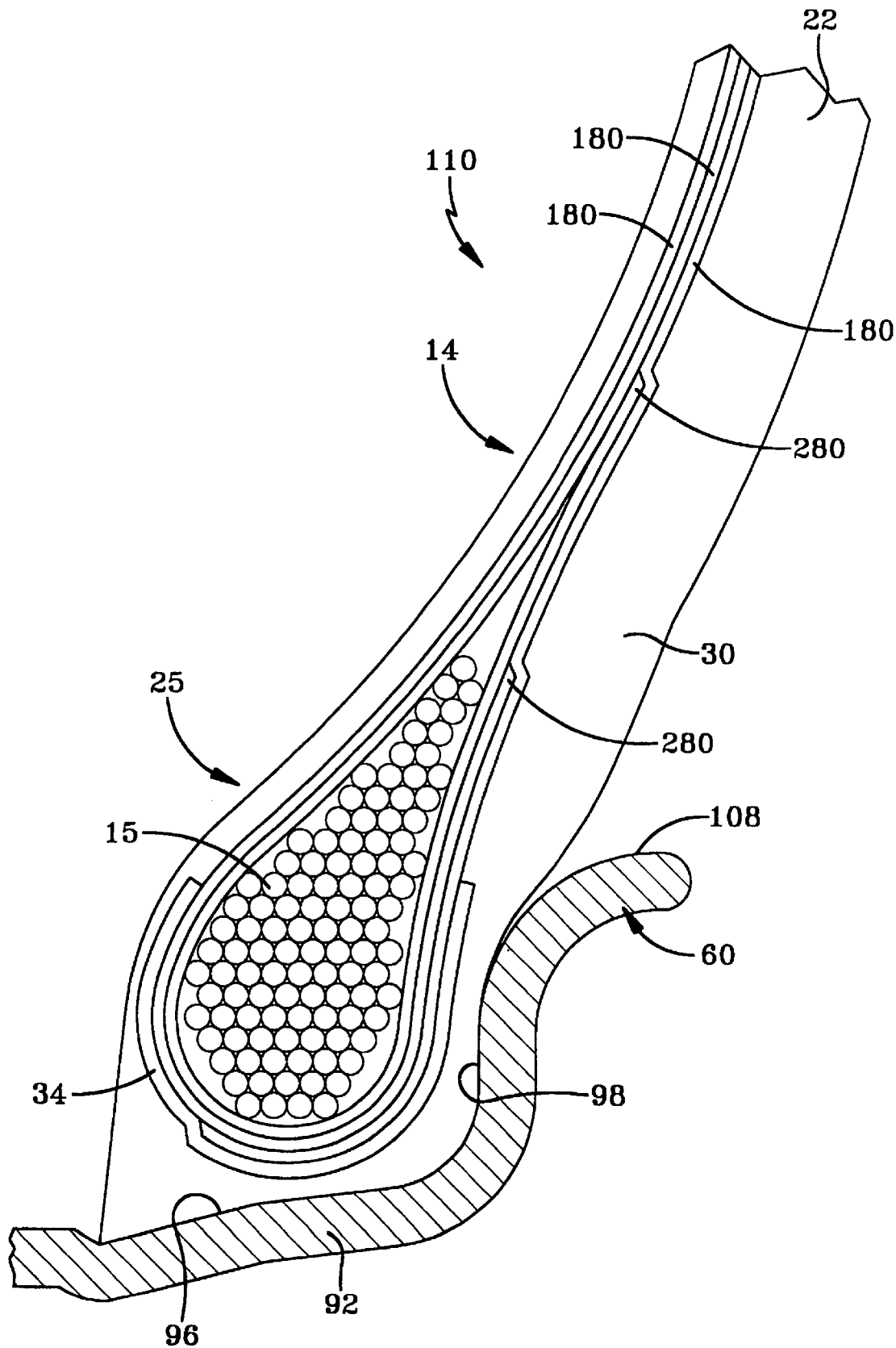
FIG. 10 shows a cross-sectional view of a bead portion of a bias ply heavy duty tire employing a single bead core.

As shown in FIGS. 7, 8 and 10 by providing one or more bead cores 15,150,151,250,251,252 that have a radial height above radially outer surface 108 of the rim flange 98 and by adhering the turnup end 280 back on to the ply 180 it is feasible to reduce the number of bead cores by one or more without experiencing the detrimental effects associated with the prior art bias tires. This is primarily made possible due to the greatly enhanced lateral and radial stiffness achieved by having the bead cores 15,150,151,250,251,252 extend radially above the rim flange 98.

FIG. 7 shows a bead portion 25 having dual bead cores 150,151, the first bead core 150 having a taper side 154 axially inward and the second bead core 131 has a taper side 155 axially outward. Both cores 150,151 are generally triangular in construction each with vertical or flat sides 152,153 facing the other flat side. The result is very compact widthwise construction with very tall bead cores 150,151.

FIG. 8 shows a bead portion having triple bead cores 250,251,252. In this application a third bead core 252 is placed between the two triangular axially inner 250 and axially outer 251 bead cores. It is important that the radial height ($h_a$) of at least one bead core 250,251, or 252 be at least as tall, preferably greater than the apex or height ($h_b$) of the other two bead cores 250,251,252. The radially outer surface 253 may be flat and in such a case tile small rubber apex 24 preferably should be employed. Alternatively, the bead core 252 can be triangularly shaped at the radially outer location 253. In such a design the slope of the triangular portion 253 should be above the apex of an adjacent bead core 250, or 251 and preferably has a similar slope. As shown, this creates a smooth extension of the supporting bead cores 250,251,252 permitting them to respond to loads in a complimentary fashion.

In FIGS. 6a, 6b, 6c and 6d, the single bead core 15 design is shown having various cross-sectional shapes. In these applications, where only one bead core 15 is needed in each bead portion 25, the lower portion 15B of the bead core 15 is generally formed either rectangular (6a), round bottom (6b), square (6c) or trapezoidal (6d) wherein the lower half is similar to the lower half of a hexagonal bead. Alternatively, the shape of the lower half can simply be an extension of the triangular outer half 15A. Any number of shapes can be employed as can readily be appreciated by those of ordinary skill in the art.

Figure 5:
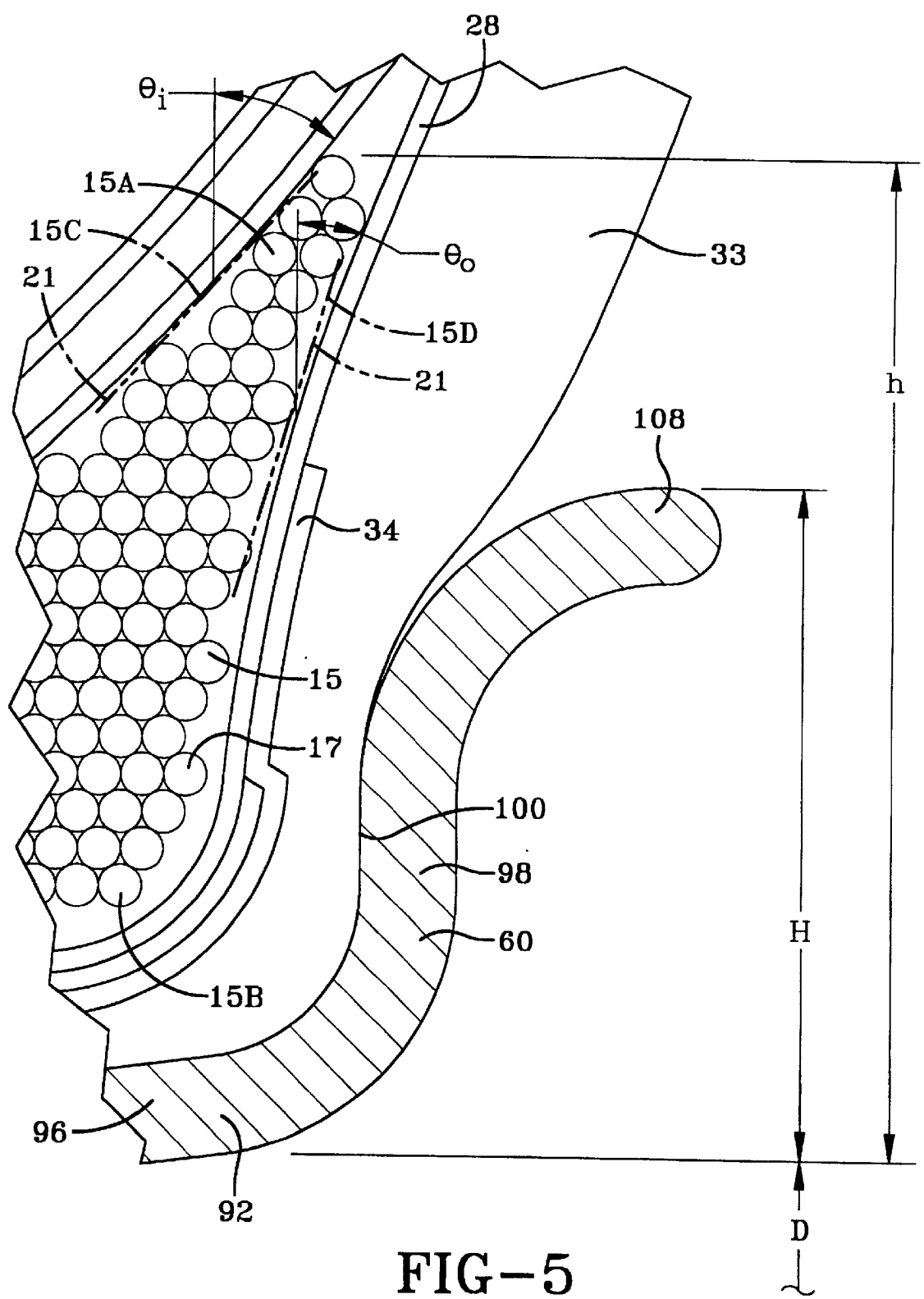
FIG. 5 is a schematic of the geometric relationship between the axially outer portion of the bead portion of the tire and the flange portion of the rim.
Figure 6A:
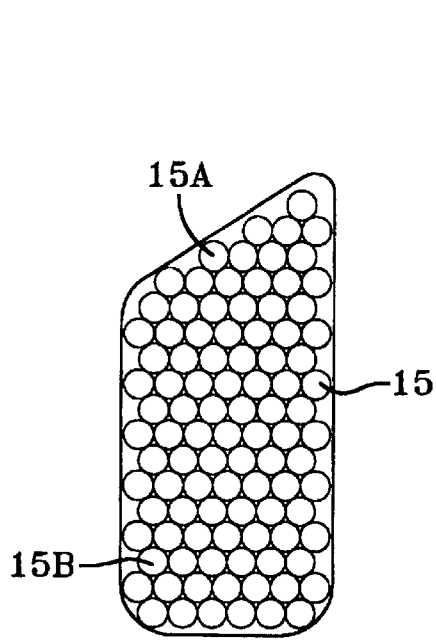
FIG. 6A, FIG. 6B, FIG. 6C and FIG. 6D are alternative bead constructions for use in a single bead tire according to the invention.
Figure 6B:
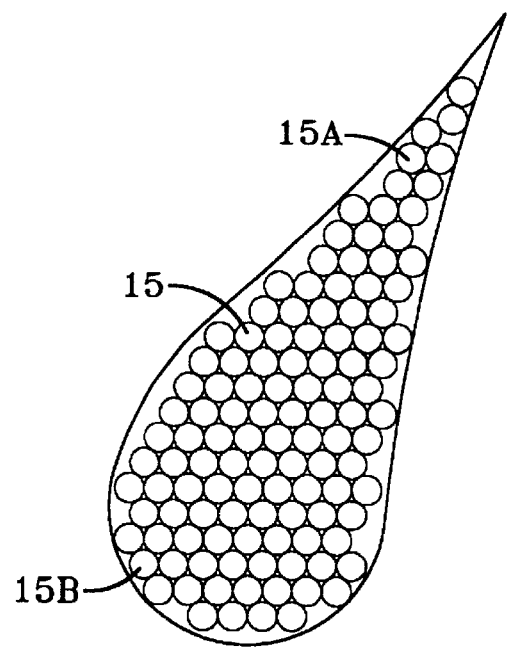
Figure 6C:
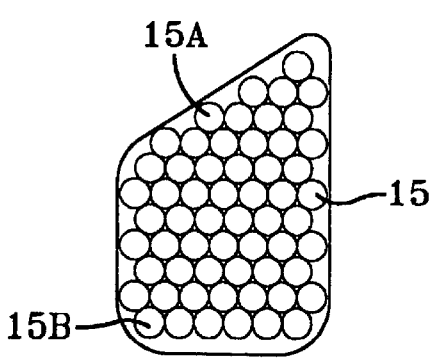
Figure 6D:
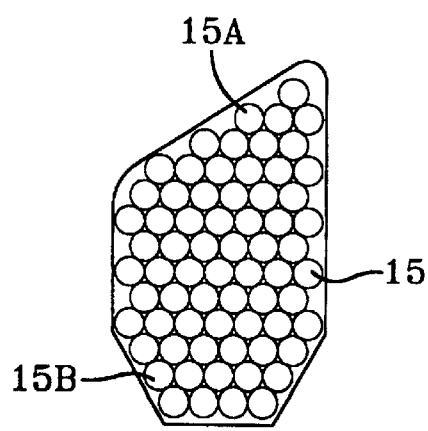

As shown in FIG. 5, this lower bead portion 15B carries a majority of the annular tensile strength of the bead core 15. As the bead core 15 extends radially outwardly from the lower portion 15B, the bead core upper portion 15A both narrows and shifts axially outwardly. If one lays a tangent line 21 along the axially inner surface 15C of the upper portion or apex 15A of the bead core 15 the resultant curved line is sloped at an angle $\theta_i$ of greater than 30° from the radial direction. The axially outer side 15D is preferably sloped in a similar direction relative to a radial or vertical line however, at a lesser angle $\theta_0$ of equal to or greater than 0° relative to the radial direction. As shown, $\theta_i$ is about 40° and $\theta_o$ is about 15°. One of ordinary skill in the art will readily appreciate that the axially outer surface 15D is axially outwardly of the lower radially inner supporting bead core 15B in the preferred embodiment. This makes the bead core 15 in the shape of a conical frustum or tapered cone. The radially outer portion 15A of the bead core 15 being radially above the rim flange 98 and due to its eccentric shape acts like a spring having a very high spring rate.

Figure 9A:
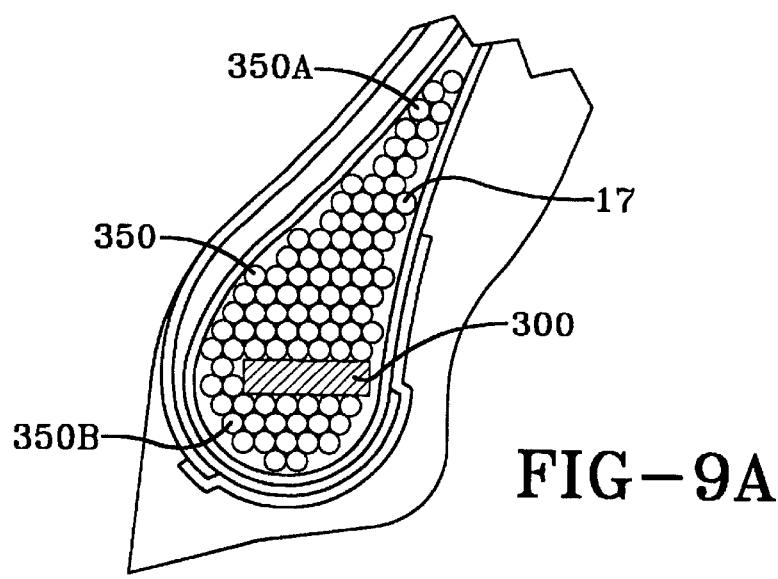
FIGS. 9A and 9B show cross-sectional views of alternative bead cores having a rubber or elastomeric precured insert.
Figure 9B:
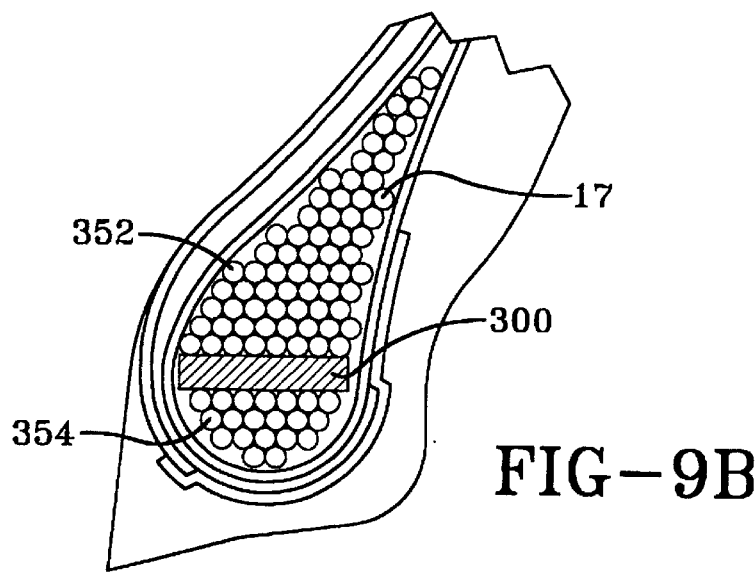

As shown in FIG. 9A, to further enhance the flexibility of the upper portion 350A of the bead core 350, it is feasible that during the assembly of the bead core 350 strip of elastomeric material 300 or other compliant material may be inserted between the lower portion 350B and upper portion 350A of the bead core 350. This results in a change in the effective spring rate creating a hinged bead core 350 that permits additional increases in flexibility. Alternatively, the strip 300 can be placed between two separate components 352,354 as shown in FIG. 9B. The resultant effect of this bead bundle is a slightly more compliant and softer spring rate.

It is important to note that each of these monofilament wires 17 can be made from various diameters. Typically ranging from 1.0 mm (0.037") to about 2.0 mm (0.080"). Typically, for earthmover tires 1.8 mm to 2.0 mm (0.072" to 0.080") are used for the larger radial earthmover tires and wire diameters 1.0 mm (0.037") and 1.25 mm (0.050") are typically used in the bias tires for earthmover. Similar sizes of wire diameters are used in aircraft, run-flat passenger and specialty and agricultural tires.

Figure 9C:
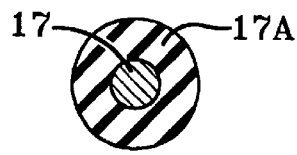
FIG. 9C shows a cross-section of a bead core wire strand or filament coated in rubber.

As shown in FIG. 9C, another method for reducing the stiffness of the overall bead bundle or bead core is to increase the rubber gauge 17A around each wire 17. These wires 17 have co-extruded elastomer 17A placed around the wire filament. Typically 7 mm to 2.5 mm (03 to 0.010 inches) of rubber material is employed. When the tire 11,110 is vulcanized, this material tends to fill in all the gaps around the bead core 15 making it one cohesive element. By hardening or coating material 17A prior to wrapping the bead core 15,150,151,250,251,252 this material can maintain its location between the wire filaments, therefore, softening or creating a rubber dampened type bead core 15.

As shown, in FIG. 3. the wires 17 are laid up in a radially outward fashion wherein the radially inner first layer comprises 5 strands of wire, the second layer, 6, the third through seventh layers having 7 wires, and the eighth and ninth layers, 6 wires each, the tenth and eleventh layers, 5, the twelfth layer, 4, the thirteenth through fifteenth layers, 3, the sixteenth and seventeenth layers, 2, and the top eighteenth layer having one wire. This geometric shape having the radially outer portion 15A tapered as shown dramatically yields to its spring-like effect. By increasing the height lateral loads can be dampened and by increasing the width of the lower bead core 15B, the torque capacity can be change such that the bead to rim fitment is more secure by employing a wider based bead core 15.

As shown in FIG. 10, the bias tire according to the present invention can have four ply turnups wrapped around a single bead 15 and then two plies turned down around the bead core 15. The conventional prior art bias tire is manufactured by having two plies turnup about the first bead 16 and then two additional plies turnup about a second bead 16 and then two plies turned down. By eliminating one of these beads 16 by employing this new bead core 15 according to the present invention a great increase in the manufacturing speed is achieved.

Figure 8A:
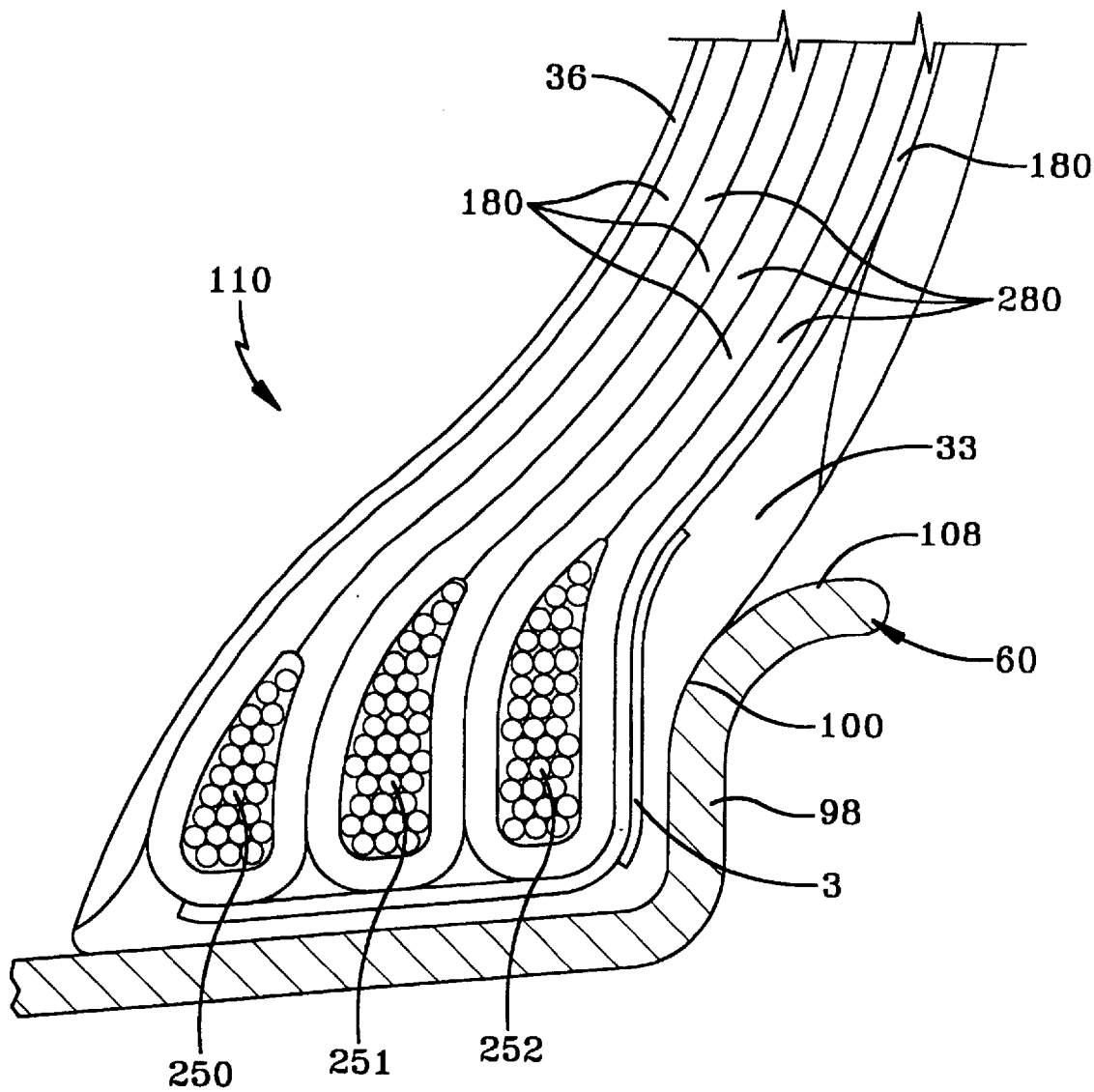
FIGS. 8A and 8B are cross-sectional views of the bead portion of a tire employing three bead cores according to the invention.
Figure 8B:
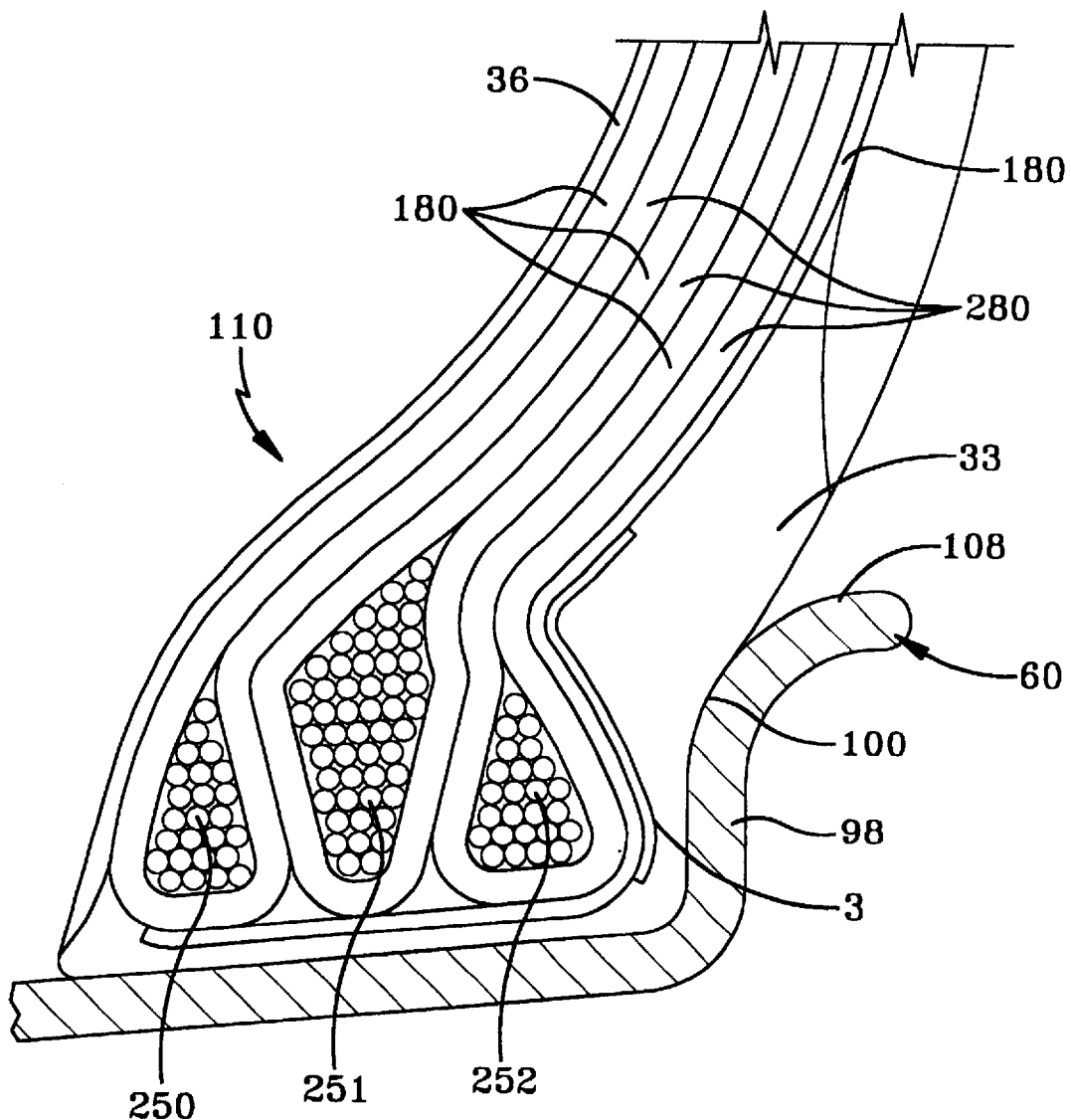

As previously discussed in the use of bias tires, the elimination of one bead core is easily achieved. It has been determined that the bead cores as illustrated in FIG. 7 or FIG. 8 whether they be 2 or 3 bead cores 150,151,250,251, 252 per bead portion 25 should have an angular configuration such that the beads work in cooperation where if the plies 18 wrapped about the first or axially inner bead core are deflected the bead core tends to rock about the axially adjacent bead core tending the increase the clenching of the ply turnup 28. This dramatically reduces any loads at the ends of the turnups 28 because the beads are clinching tightly around the plies. Alternatively, the turnups 28 about the axially outer carcass plies 18 when stressed tend to rotate the second bead core 151,251 at the base tightly into the first bead core 150,252 again creating a clenching action. This inner cooperation between the adjacent cores is achieved whether the beads have vertical faces or are overlappingly sloped as shown in FIG. 8A or 8B creating an interlocking radial interference between adjacent bead cores. It is believed that this interaction creates a much tighter working relationship than the conventional strap bead 16. This is achieved by the employment of monofilament wrapped single wire 17 bead cores which when tensioned act across the entire bead core's surfaces. This feature was heretofore unachievable, in multiple bead core designs such as aircraft, agriculture or other bias tire applications.

What is claimed is:

1. A heavy duty pneumatic tire (11, 110) having a nominal rim diameter, an axis of rotation and a carcass (14), the carcass (14) having one or more cord reinforced plies (18) and a pair of bead portions (25), each bead portion (25), having at least one annular inextensible bead core (15, 150, 151, 250, 251, 252, 350) about which the cord reinforced plies (18) are wrapped, a tread (12) and a belt reinforcing structure disposed radially outward of the carcass, each bead portion (25) has a radially inner first surface (96) and a radially outwardly extending second surface (100), the first and second surfaces (96, 100) of the bead portion (25) being designed to engage a design rim (60), the design rim (60) having a pair of bead seat portions (92) and radially outwardly extending rim flanges (98), the tire (11, 10) when mounted on its design rim (60) being characterized by:

at least one bead core (15, 150, 151, 250, 251, 252, 350) in each head portion (25) extending from radially above the bead seat portion (92) of the rim (60) to radially outwardly beyond the radially outer surface (108) of the rim flange (98), the at least one bead core (15, 150, 151, 250, 251, 252, 350) in each bead portion (25) being inclined at an angle $\theta_i$ of greater than 30° from the radial direction at a radially outer apex 15A to be substantially parallel to the ply path (19) and the one or more cord reinforced plies (18) has a ply turnup end (28) extending axially and radially outwardly from the at least one bead core (15, 150, 151, 250, 251, 252, 350), the at least one bead core having a spring-rate lowering layer inserted between a lower portion of the head core and an upper portion of the head core.

2. The heavy duty pneumatic tire (11, 110) of claim 1 further characterized by:

the at least one bead core (15, 150, 151, 250, 251, 252, 350) in each bead portion (25) extending radially above the rim flange being formed from a single strand of monofilament steel wire (17).

3. The heavy duty pneumatic tire (11, 110) of claim 1 further characterized by:

the at least one bead core (15, 150, 151, 250, 251, 252, 350) in each bead portion (25) extending radially above the rim flange (98) having a radially outer portion (15A) that is triangular in cross-section and a radially lower portion (15B) near the bead seat portion (92) of the design rim (60).

4. The heavy duty pneumatic tire (11, 110) of claim 3 wherein the radially outer portion (15A) of the at least one bead core (15, 150, 151, 250, 251, 252, 350) extending radially above the rim flange (98) has an axially outer surface (15D) that is partially axially outward of the radially lower portion of the bead core (15B).

5. The heavy duty pneumatic tire (11, 110) of claim 1 further characterized in that:

the carcass (14) has one or more cord reinforced radial plies (18) wrapped about one bead core (15) in each bead portion (25), the one bead core (15) in each bead portion (25) extending from above the bead seat portion (92) to radially above the radially outer surface (108) of the rim flange (98).

6. The heavy duty pneumatic tire (11, 110) of claim 1 further characterized in that:

the carcass (14) has a plurality of cord reinforced bias plies (180).

7. The heavy duty pneumatic tire (110) of claim 6 wherein the bead portion (25) has two bead cores (150, 151), at least one bead core (150, 151) extending radially above the rim flange (98) are in each bead portion (25).

8. The heavy duty pneumatic tire (110) of claim 6 wherein three bead cores (250, 251, 252) are in each bead portion (25), at least one bead core (250, 251, 252) in each bead portion (25) extending radially above the rim flange (98).

9. The heavy duty pneumatic tire (110) of claim 8 wherein the bead cores (250, 251, 52) are sloped creating a radial interference between adjacent bead cores in each bead portion (25) of the tire (110).

* * * * *

UNITED STATES PATENT AND TRADEMARK OFFICE
CERTIFICATE OF CORRECTION

PATENT NO. : 6,422,280 B1 Page 1 of 1
DATED : July 23, 2002
INVENTOR(S) : Anthony William Thomas It is certified that error appears in the above-identified patent and that said Letters Patent is hereby corrected as shown below:

Column 9,
Line 47, delete "(11, 10)" and insert -- (11, 110) --.

Column 9,
Line 50, delete "head" and insert -- bead --.

Column 10,
Line 8, delete "head" and insert -- bead -- in both instances.

Signed and Sealed this

Twenty-sixth Day of November, 2002

Attest:

JAMES E. ROGAN
Attesting Officer        Director of the United States Patent and Trademark Office